United States Patent [19]

Cahill et al.

[11] Patent Number: 4,571,718
[45] Date of Patent: Feb. 18, 1986

[54] OPTICAL DISK CARTRIDGE AND COOPERATING APPARATUS

[75] Inventors: Steven P. Cahill, Newton, Mass.; Roger G. Covington, Rochester, N.Y.

[73] Assignee: Eastman Kodak Company, Rochester, N.Y.

[21] Appl. No.: 629,875

[22] Filed: Jul. 11, 1984

[51] Int. Cl.$^4$ .................. G11B 7/00; G65D 85/30
[52] U.S. Cl. .................. 369/291; 206/309; 360/133; 369/273
[58] Field of Search .......... 369/291, 273; 360/133, 360/97; 206/309, 316

[56] References Cited

U.S. PATENT DOCUMENTS

| | | | |
|---|---|---|---|
| 3,529,301 | 9/1970 | Hiruta | 340/174.1 |
| 3,609,722 | 9/1971 | Zenzefilis | 340/174.1 C |
| 4,078,246 | 3/1978 | Berthoux et al. | 360/133 |
| 4,131,199 | 12/1978 | Hatchett et al. | 206/444 |
| 4,175,274 | 11/1979 | Mann | 360/133 |
| 4,320,425 | 3/1982 | Hall | 360/97 |
| 4,378,576 | 3/1983 | Roling | 360/137 |
| 4,394,700 | 7/1983 | Edwards | 360/133 |
| 4,400,748 | 8/1983 | Bauck et al. | 360/99 |
| 4,405,136 | 9/1983 | Elsing et al. | 277/12 |
| 4,477,894 | 10/1984 | Clurman | 369/291 |

FOREIGN PATENT DOCUMENTS

| | | | |
|---|---|---|---|
| 51339 | 5/1982 | European Pat. Off. | 369/291 |
| 172575 | 10/1982 | Japan | 369/291 |

Primary Examiner—Steven L. Stephan
Attorney, Agent, or Firm—William C. Dixon

[57] ABSTRACT

Structure is provided for separately sealing an optical disk cartridge and cooperating apparatus closed when the cartridge and apparatus are not operatively engaged for intended use, and for opening the cartridge and apparatus to each other while jointly closing them from the environment when they are so engaged. The optical disk includes a magnetically attractable hub bearing a compliant annular seal. The disk-containing cartridge is permanently closed except for a central drive-access opening in one wall thereof that is bounded by a circular rim concentrically aligned with the hub seal. Magnetic means on that wall attract the hub and thereby draw its seal into firm contact with the rim, to seal the opening closed whenever the cartridge is not in use. The cooperating apparatus includes a drive spindle that is bounded by a circular flange also concentrically aligned with the hub seal. Associated mechanism engages the spindle axially with the hub so as to move the flange into contact with the hub seal while moving the seal out of contact with the rim. Encircling the spindle is a resiliently flexible housing member bearing a compliant annular seal concentrically aligned with both the flange and the rim. The housing member is biased toward the flange and rim so as to urge its seal into contact with either the flange, to seal the housing closed whenever the spindle is not engaged with the hub, or the rim, to seal the housing to the cartridge when the spindle is so engaged.

16 Claims, 9 Drawing Figures

OPTICAL DISK CARTRIDGE AND COOPERATING APPARATUS

BACKGROUND OF THE INVENTION

1. Field of the Invention

The present invention relates generally to optical disk cartridges and apparatus cooperable therewith, and particularly to an arrangement for sealing such a cartridge closed against entry of foreign elements, both during storage and handling of the cartridge and during use thereof in cooperating apparatus.

2. Description of the Prior Art

U.S. Pat. Nos. 4,320,425 and 4,405,136 each disclose a disk cartridge having resiliently flexible top and bottom walls, the bottom wall including a central opening bounded by a circular lip that resiliently presses against a mating annular surface of the hub of a disk inside the cartridge, the top wall including an inwardly extending flange that resiliently holds the hub in sealing contact with the bottom wall lip and the recording portion of the disk spaced from the walls. Operative engagement of the cartridge and hub by cooperating disk-drive apparatus causes both walls to flex out of contact with the hub and thus free the disk for rotation in the cartridge. Such engagement includes supporting engagement of the cartridge bottom wall by a stationary part of the apparatus and driving engagement of the disk hub by a rotatable drive spindle. In U.S. Pat. No. 4,405,136, the stationary part of the apparatus supports the cartridge bottom wall through a pneumatic, pressurized, annular seal that allows only filtered air from within the apparatus to enter the cartridge.

U.S. Pat. Nos. 3,609,722, 3,529,301, and 4,394,700 each disclose a disk cartridge having top and bottom walls that need not flex in order to be sealed to and unsealed from a disk inside the cartridge. In U.S. Pat. No. 3,609,722, the top and bottom walls each have a central opening bounded by a separate, resilient, compressible, annular washer disposed between the wall and the disk. Each wall is thus sealed to and spaced from the disk by the washer therebetween. Operative engagement of the cartridge and washers by cooperating disk-drive apparatus causes the cartridge bottom wall to be supported by a stationary part of the apparatus and both washers to be compressed by opposing flanges on a rotatable drive spindle. Such engagement not only unseals and frees the disk from each cartridge wall; it also seals and couples the disk to the drive spindle. In U.S. Pat. No. 3,529,301, the top and bottom walls each have a central opening bounded by an annular flange formed by the wall itself so as to mate with a facing surface on the disk hub. Each wall is thus sealed to and spaced from the disk by the flange thereon. The disk is restrained from moving relative to the walls by a spring-loaded brake that normally bears against the disk periphery. Operative engagement of the cartridge and disk hub by cooperating disk-drive apparatus causes the brake to be withdrawn from the disk and the hub to be pushed upwardly away from each wall flange by a rotatable drive spindle. Such engagement frees the disk contact with the cartridge walls and sealingly couples the disk to the spindle. In U.S. Pat. No. 4,394,700, the cartridge bottom wall has a central opening bounded by an annular flange which mates with a corresponding flange on the disk hub. Mounted on or near the wall flange is a plurality of spring-loaded clamping members which normally press the wall flange and hub flange together so as to seal the hub securely to the bottom wall. Operative engagement of the cartridge and hub by cooperating disk-drive apparatus actuates the clamping members, against their spring-loading, to unclamp the flanges and thus free the disk for rotation, while a rotatable spindle in the apparatus drivingly engages the hub.

Prior-art schemes such as those described above may have been satisfactory in some applications, but there remains a need for an improved arrangement by which an optical disk permanently contained in a cartridge is protected against damage or impairment from other objects or contaminants during storage, handling, and use of the disk. Such an arrangement should both restrain the disk from moving inside the cartridge and seal the cartridge closed whenever the cartridge is not operatively positioned for its intended use in cooperating write/read apparatus, but should readily accommodate a disk-drive member of such apparatus and free the disk for rotation thereby whenever the cartridge is so positioned. Such an arrangement should also provide ready optical access to the information-storage medium of the disk by an optical write/read head in the apparatus when the cartridge is operatively positioned therein. Preferably these things should be accomplished by an arrangement that is more efficient, reliable, and durable over the expected life of the cartridge, and simpler and less costly to manufacture, than those employed heretofore.

SUMMARY OF THE INVENTION

Accordingly, an object of the present invention is to provide a more efficient, reliable, and durable way of protecting an optical disk in a cartridge against possible damage or impairment by other elements during storage, handling, and use of the disk.

This object is achieved by the invention herein claimed. The invention embraces novel features of both a disk-containing cartridge and apparatus cooperable therewith.

The invention thus finds utility in an optical disk cartridge adapted for use in cooperating write/read apparatus having a rotatable drive spindle and a movable optical head. The cartridge contains a rigid optical disk including a flat information-storage medium and a magnetically attractable hub with a compliant annular seal thereon projecting from the medium. The cartridge comprises first and second substantially rigid, opposed walls that are fixedly spaced from and substantially coextensive and parallel with each other, the disk being disposed between and substantially parallel with those walls. The first wall has a round opening therein concentric with the disk hub to provide access thereto by the drive spindle of the cooperating apparatus. The opening is bounded by a circular rim aligned with the annular hub seal. The first wall bears magnetic means near the rim for attracting the hub and thereby drawing the hub seal into sealing contact with the rim, to retain the disk in stationary, sealed relationship with the first wall when the cartridge is not operatively positioned in the cooperating apparatus. The hub is engageable and axially movable by the apparatus drive spindle away from the first wall, in opposition to the magnetic means, to urge the disk out of its stationary, sealed relationship and thereby render the disk free to rotate when the cartridge is operatively positioned in the cooperating apparatus. In the illustrated embodiment, the cartridge second wall has a window therein aligned with a portion of the disk medium to provide optical access to the medium by the optical head of the cooperating apparatus. The window has a thin, planar sheet of transparent material extending thereacross to protect the medium from exterior contaminants without interfering with optical access. Preferably, a closure member is mounted on the second wall for movement from a closed position covering the window to an open position uncovering the window, to protect the window and thereby further protect the medium when the cartridge is not in use in the cooperating apparatus, and to permit optical access when the cartridge is in such use.

The invention also finds utility in apparatus for recording and retrieving information on an optical disk contained in a cartridge, the disk having a flat, substantially rigid information-storage medium and a magnetically attractable hub with a compliant annular seal thereon projecting from the medium, the cartridge including first and second opposed, parallel, rigidly spaced walls disposed on opposite sides of the disk, the first wall having an opening therein bounded by a circular rim concentrically aligned with the annular hub seal and magnetic means near the rim for attracting the hub and thereby drawing the hub seal into sealing contact with the rim, to retain the disk in stationary, sealed relationship with the first wall when the cartridge is not in use. Such apparatus comprises means for supporting the cartridge in an operative position; a drive spindle rotatable about an axis and engageable with the disk hub, the spindle having a circumferential flange thereon that is concentrically aligned with the annular hub seal when the cartridge is in its operative position, the spindle being mounted for movement along said axis through the first wall opening and toward the second wall when the cartridge is in said position; and means for moving the drive spindle along said axis through the first wall opening and toward the second wall into engagement with the hub, so as to push the hub away from the first wall, in opposition to the magnetic means thereon, and thereby urge the disk out of its stationary, sealed relationship, to render the disk freely rotatable relative to the first wall when the cartridge is in use, the flange moving concurrently into sealing contact with the hub seal to seal the disk to the spindle when the disk is not sealed to the first wall. In the illustrated embodiment, the apparatus has an enclosure including a movable member with a compliant annular seal thereon encircling the spindle, the enclosure member seal being concentrically aligned with the circular rim when the cartridge is in its operative position. The enclosure member seal moves parallel with the spindle axis into sealing contact with the rim, as the flange moves into sealing contact with the hub seal, to seal the first wall to the enclosure member when the first wall is not sealed to the disk. The enclosure member seal also is concentrically aligned with the spindle flange and is in sealing contact therewith, when the flange is not in sealing contact with the hub seal, to seal the enclosure member to the spindle when the enclosure member is not sealed to the first wall. The apparatus also has means for rotating the spindle about its axis, to impart rotation to the disk when the spindle has been engaged with the hub, and an optical head, mounted for close traversing movement relative to an optical access window in the cartridge second wall facing a portion of the disk medium, for optically recording and retrieving information on the medium through the window when said rotation has been imparted to the disk.

An advantage of this invention is that it achieves its aforementioned object by an arrangement which is especially suitable for protecting optical disks capable of high-density information storage, and which is reasonably simple and practical to manufacture and use.

The invention, and its objects and advantages, will become more apparent in the detailed description of the preferred embodiment presented below.

BRIEF DESCRIPTION OF THE DRAWINGS

In the detailed description of the preferred embodiment of the invention presented below, reference is made to the accompanying drawings, wherein like reference numerals denote like elements and wherein.

DESCRIPTION OF THE PREFERRED EMBODIMENT

Because certain parts of disk cartridges and associated apparatus are well known, the following description is directed in particular to those elements forming, cooperating directly with, or relating to the present invention. Elements not specifically shown or described herein are selectable from those known in the relevant art.

Figure 1:
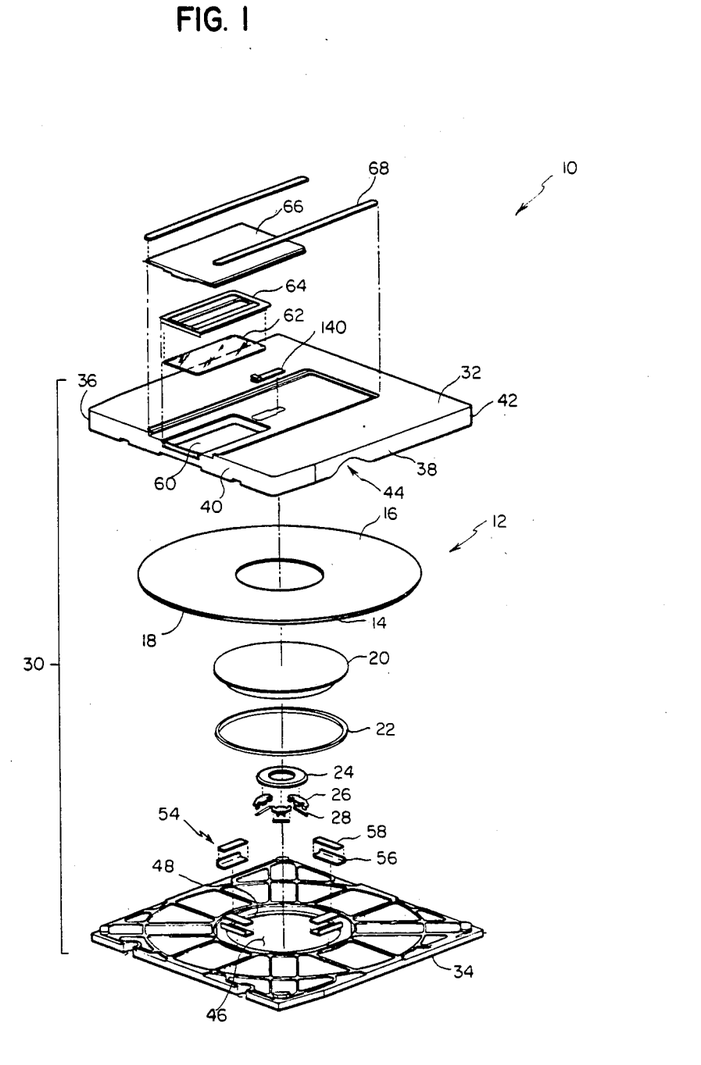
FIG. 1 is an exploded perspective view of an optical disk cartridge constructed in accordance with the preferred embodiment of the present invention.

Illustrated in FIG. 1, in exploded form, in an optical disk cartridge 10 constructed in accordance with the preferred embodiment of the invention. Cartridge 10 is adapted to contain, permanently, an optical disk 12 comprising a circular, substantially rigid and flat, information storage medium 14 having upper and lower sides 16 and 18, respectively, with a solid, magnetically attractable, ferrous-metal hub 20 bonded to and projecting from the lower side. On the bottom side of hub 20 are a compliant annular seal 22 and, radially inward thereof, a flexure mount guide 24. On guide 24 are a plurality of (three shown) circumferentially spaced flexure mounts 26, each holding a resiliently flexible pin, or flexure, 28.

Cartridge 10 comprises a generally square-shaped housing 30 formed by six orthogonally joined, substantially rigid walls 32, 34, 36, 38, 40, and 42, which together define a cavity 44 for accommodating the disk. Opposed top and bottom walls 32 and 34 are substantially parallel and coextensive with each other, and are fixedly spaced from each other by opposed side walls 36 and 38 and opposed end walls 40 and 42. Disk 12 is disposed between and substantially parallel with the cartridge top and bottom walls so that top wall 32 and bottom wall 34 face the disk upper and lower sides 16 and 18 respectively.

The cartridge bottom wall has a central drive-access opening 46 therein substantially concentric with the disk hub. As shown more clearly in FIGS. 3 and 4, opening 46 is bounded by a circular rim 48 having upper and lower seal-contacting lips 50 and 52, the upper lip 50 being concentrically aligned with the hub annular seal 22. On bottom wall 34 near rim 48 are magnetic means 54 comprising a plurality of (four shown) circumferentially spaced magnetic clips 56, each holding a permanent magnet 58. When the cartridge is not in use in cooperating apparatus, the magnetic means 54 attracts disk hub 20 so as to draw hub seal 22 into sealing contact with rim upper lip 50 and thereby retain the disk in stationary, sealed relationship with the bottom wall. The bottom wall opening 46 is thus sealed closed whenever the cartridge is not being used as intended.

The cartridge top wall 32 has an optical-access window 60 therein facing a portion of disk upper side 16. Window 60 has a thin, planar sheet 62 of transparent, preferably non-birefringent, protective material extending across and sealed to a window frame 64, to prevent exterior contaminants from passing through the window to the cartridge cavity 44, but without interfering with needed optical access to the disk medium. The top wall window is thus sealed closed at all times. On top wall 32 over window 60 is a movable closure member 66 slidably mounted between a pair of lateral retention rails 68 for movement from a normally closed position covering the window to an open position uncovering the window. Closure member 66 thus protects window sheet 62 and thereby further protects the disk medium from possible damage or impairment by external elements when member 66 is in its closed position, which is its normal position whenever the cartridge is not being used in cooperating apparatus. When the cartridge is being used, however, movement of member 66 to its open position permits the needed optical access to medium 14 through transparent window sheet 62.

It will thus be appreciated that, since there are no openings in any of the cartridge housing walls other than drive-access opening 46 and optical-access window 60, both of which are sealed closed at least when the cartridge is not in use in cooperating apparatus, the entire cartridge is closed to possible entry of deleterious elements whenever the cartridge is not being used as intended.

Figure 2:
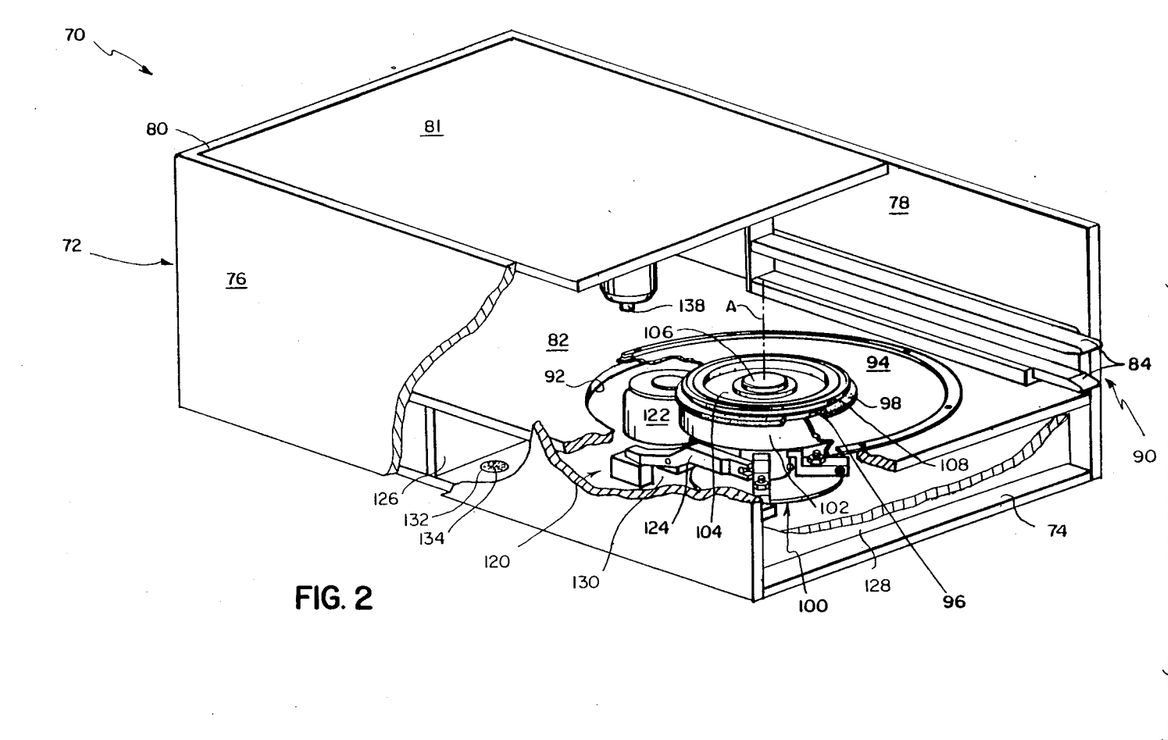
FIG. 2 is a perspective view, partly broken away, of disk-drive and write/read apparatus cooperable with the disk cartridge of FIG. 1.

Cooperating apparatus in which cartridge 10 may be used is partially illustrated in FIG. 2. The apparatus is designated generally by the numeral 70. It comprises a rectangular-shaped housing 72 formed by a horizontal base plate 74, vertical side and rear-end walls 76, 78, and 80, a horizontal top wall 81, and a vertical front-end wall (not shown) with an access door (also not shown) movably mounted thereon for loading and unloading the cartridge. Inside housing 72 is a horizontal reference plate 82 spaced from base plate 74 and joined to the vertical walls as shown. On top of plate 82 adjacent to each side wall is a pair of cartridge-receiving guides 84, which together provide a means 90 for receiving the cartridge and supporting it in an operative position. When in that position, the cartridge top and bottom walls are substantially horizontal and face the apparatus top wall and reference plate respectively.

In plate 82 between the opposing pairs of guides 84 is a circular opening 92. Mounted on and sealed to plate 82 around the periphery of opening 92 is a circular, resiliently flexible, spring-like, cover plate 94 having a central round hole 96 therein concentric with opening 92. Plate 94 extends generally horizontally across opening 92 so as to cover all of that opening except the central part thereof within hole 96. Plate 94 is made to function in the manner of a large Belleville-type spring washer, and as mounted is biased so that the radially inner portion thereof around the periphery of hole 96 exerts spring force in a generally upward direction. On that radially inner portion of plate 94 around hole 96 is a compliant annular seal 98 which is concentrically aligned with rim lower lip 52 when the cartridge is in its operative position thereabove.

Figures 3, 3A:
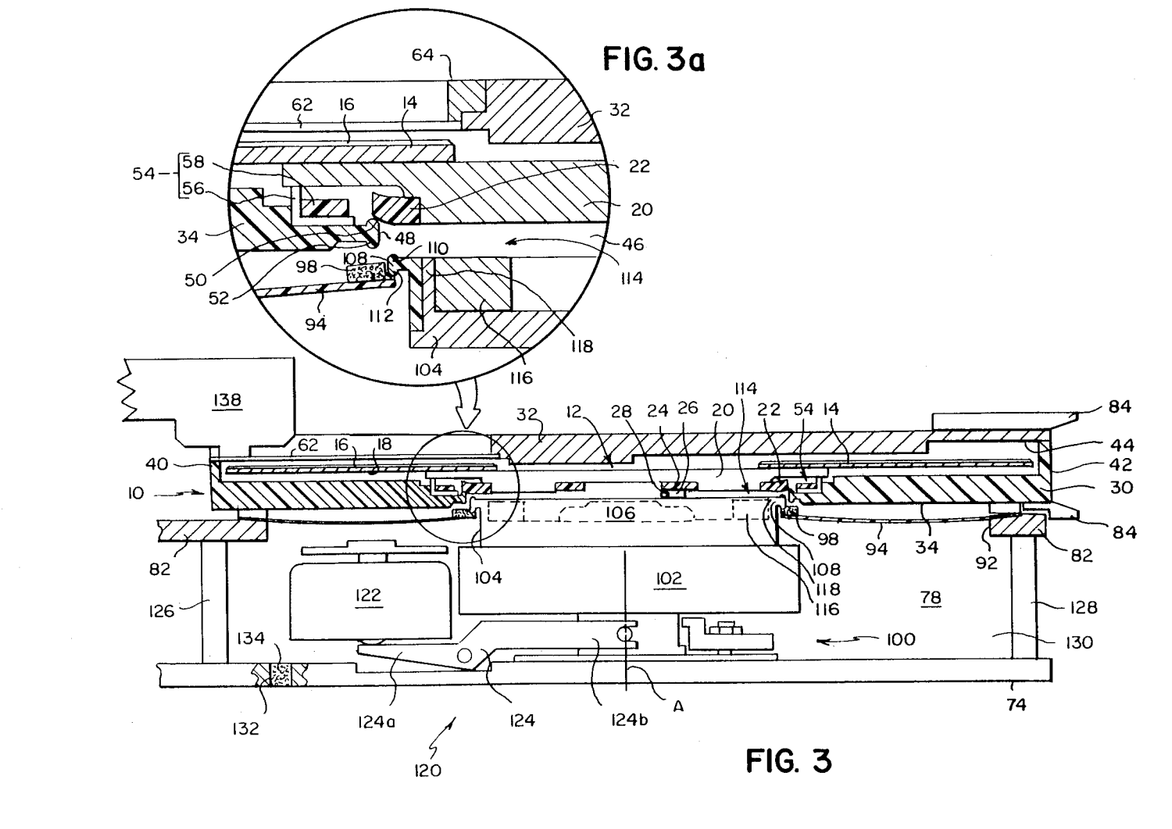
FIG. 3 is a pictorial illustration of the apparatus of FIG. 2 with the cartridge of FIG. 1 operatively positioned therein but not yet engaged by disk-drive components thereof.
FIG. 3a is an enlarged view of a portion of FIG. 3.
Figure 4:
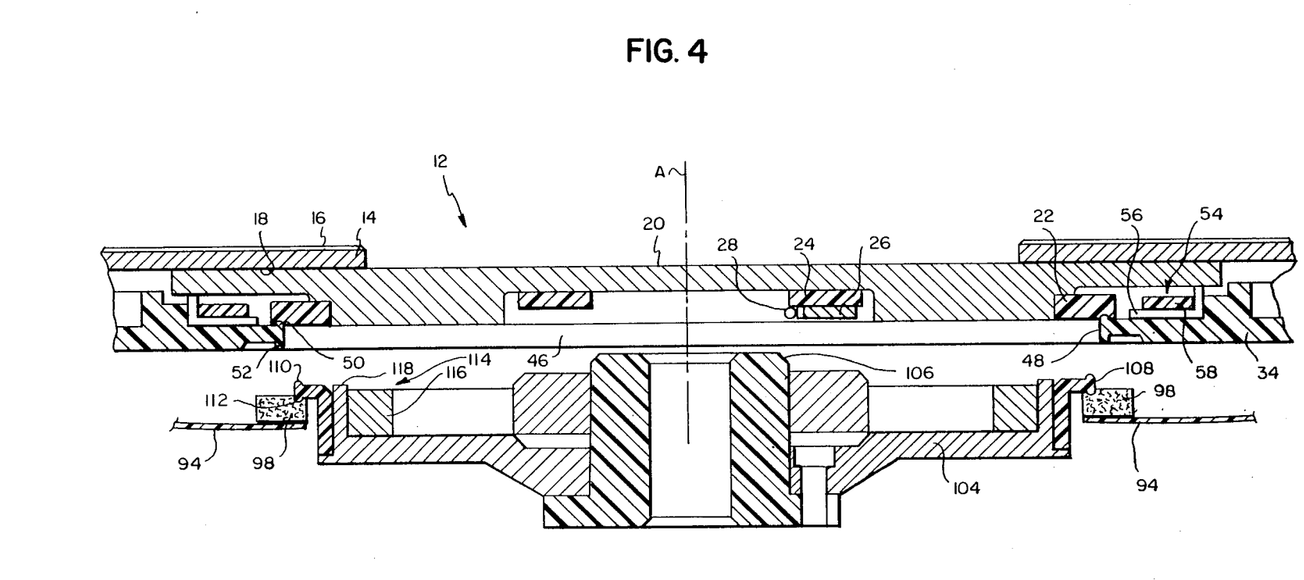
FIG. 4 is a fragmentary elevation showing parts of the apparatus and cartridge disposed substantially as depicted in FIG. 3.
Figure 5:
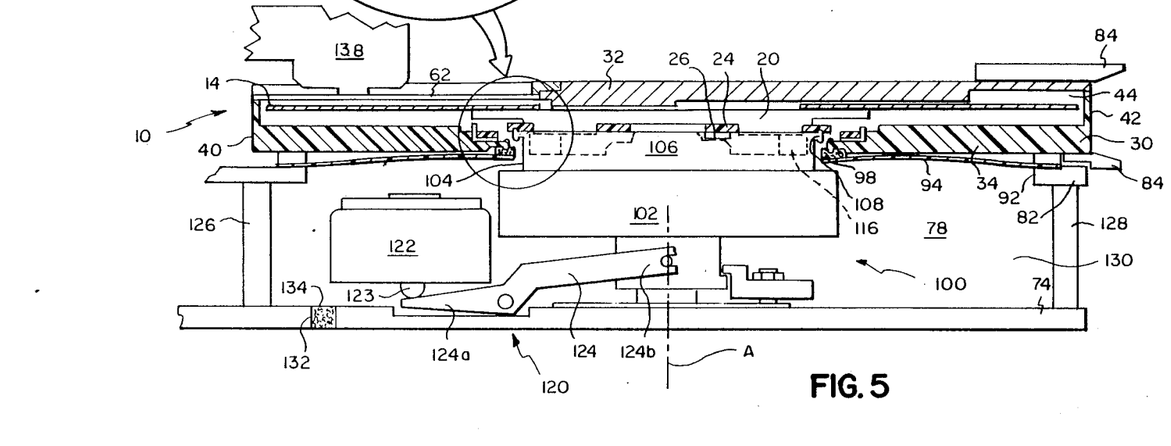
FIG. 5 is a pictorial illustration similar to FIG. 3 but showing the cartridge fully engaged by disk-drive components of the apparatus.
Figure 5A:
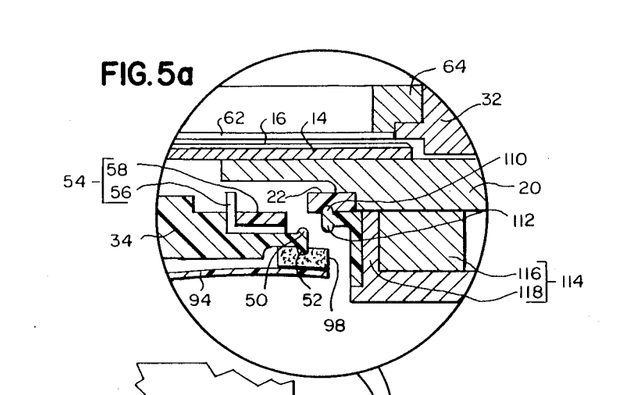
FIG. 5a is an enlarged view of a portion of FIG. 5.

Mounted on base plate 74 is a disk-drive mechanism 100 including an electric drive motor 102 with a drive spindle 104 projecting upwardly therefrom through hole 96 and toward disk hub 20 in operatively positioned cartridge 10. As shown more clearly in FIGS. 3-5, spindle 104 is concentric with both hole 96 and hub 20. Spindle 104 comprises three functional components: (1) a central shaft 106 configured to engage the flexures 28 on hub 20 for the purpose of centering disk 12 and cartridge 10 relative to the spindle; (2) a circumferential flange 108 having upper and lower seal-contacting lips 110 and 112, the upper lip 110 being concentrically aligned with hub annular seal 22, the lower lip 112 being concentrically aligned with plate annular seal 98; and (3) magnetic coupling means 114 near flange 108, including a magnetic ring 116 and an annular pole piece 118, for magnetically coupling the spindle to the hub. Spindle 104 is both rotatable about and translatable along its vertical axis A. The spindle is rotated at desired disk-drive speed by operation of motor 102. The spindle is translated toward and away from the disk hub 20 by operation of an electromechanical actuator 120. As shown in FIGS. 3 and 5, actuator 120 comprises a solenoid 122, including a spring-biased plunger 123, and a two-armed lever 124. One arm 124a of lever 124 is operatively engaged with the solenoid plunger; the other arm 124b is coupled to the motor. Energization of the solenoid actuates plunger 123 against its spring bias and thereby causes counterclockwise rotation of the lever and consequent upward movement of both motor and spindle towrd the disk hub. Susequent de-energization of the solenoid causes spring-assisted rotation of the lever clockwise and thereby effects downward movement of the motor and spindle away from the hub.

FIGS. 2 and 3 show the disk-drive mechanism in its unenergized condition, wherein motor 102 and spindle 104 are disposed in their fully lowered, at-rest positions. When so positioned, the spindle flange lower lip 112 is in firm sealing contact with plate annular seal 98, such contact being maintained by the upward bias of plate 94. Since there are no openings in the spindle radially inward of flange 108, the entire circular opening 92 in plate 82 is sealed closed by cover plate 94, seal 98, and the spindle. Spring-like cover plate 94 thus significantly serves as a movable enclosure member of apparatus 70.

Shown in FIGS. 3 and 5 are a pair of horizontally space, vertical internal walls 126 and 128 that extend between and join with plates 74 and 82 and walls 76 and 78 to enclose a chamber 130 which accommodates disk-drive mechanism 100 and actuator 120. With the foregoing cooperation of plate 94, seal 98, and lip 112, that whole chamber is thus sealed closed against possible entry of deleterious external elements whenever the motor and spindle occupy their lower, at-rest positions shown in FIGS. 2 and 3. Preferably, an opening 132 is provided in plate 74, between walls 126 and 128, for receiving a filter 134 which will permit only filtered air to enter chamber 130.

FIG. 3 also shows the cartridge 10 supported in its operative position above the disk-drive mechanism. As seen in that figure and in FIGS. 3a and 4, with the mechanism not yet energized, the spindle is still sealed to cover plate 94, and the disk is still sealed to cartridge bottom wall 34, whereby the chamber 130 and cartridge 10 are each separately closed from the environment.

Figure 6:
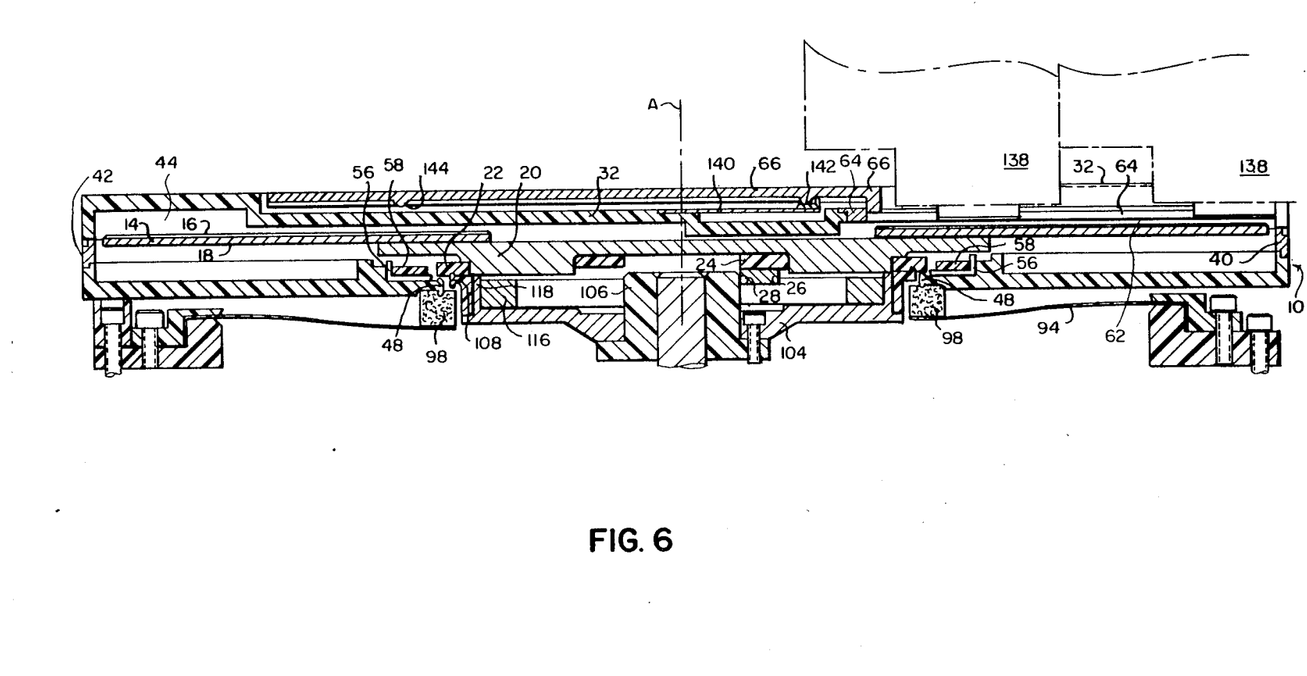
FIG. 6 is an elevation showing, in greater detail, parts of the apparatus and cartridge disposed substantially as depicted in FIG. 5.
Figure 7:
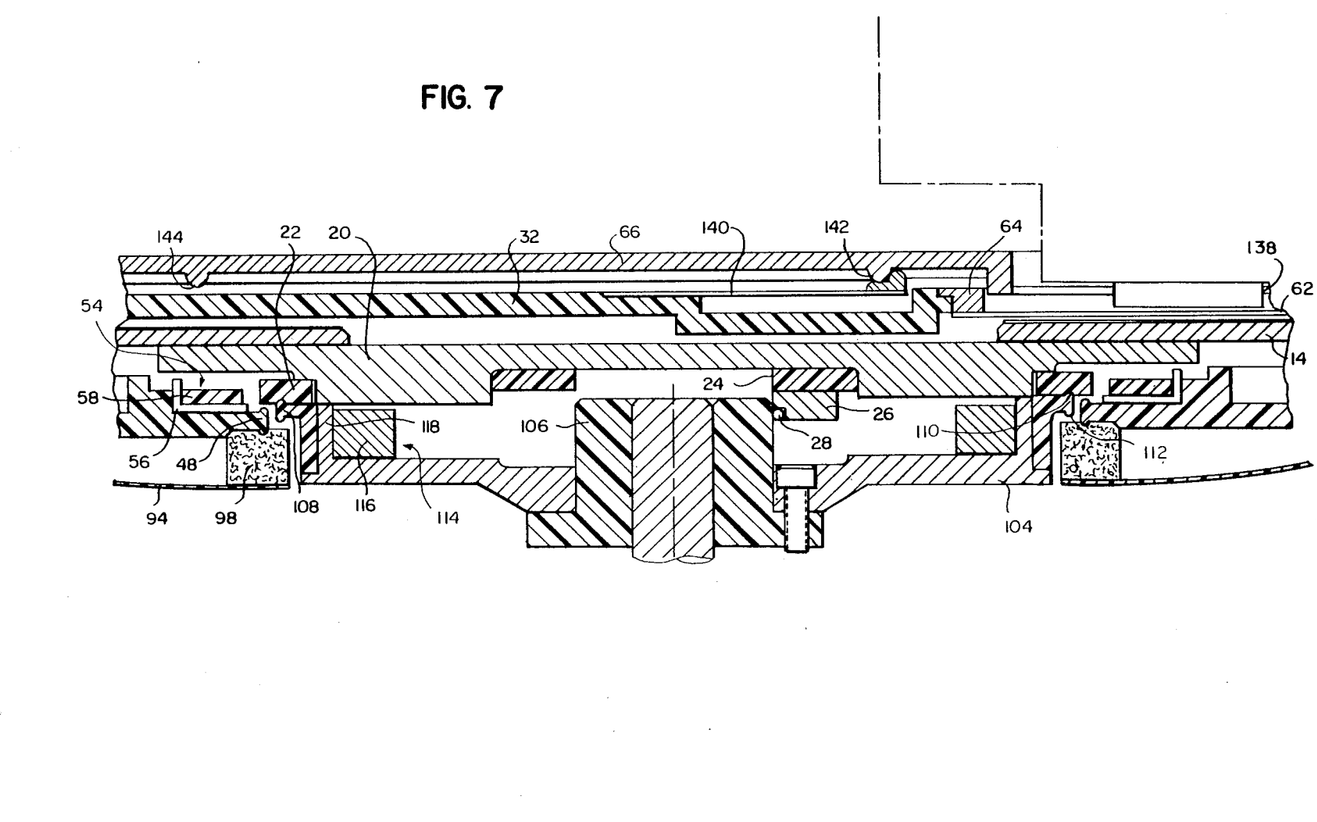
FIG. 7 is an enlarged view of a portion of FIG. 6.

FIGS. 5–7 show the disk-drive mechanism in its energized condition, with spindle 104 moved to its fully raised position in driving engagement with disk hub 20. During upward movement of the spindle to that position from its lower position shown in FIG. 3, the upward bias of cover plate 94 causes annular seal 98 thereon to follow spindle flange lower lip 112, and thus remain in sealing contact therewith, until flange lower lip 112 reaches the plane of cartridge rim lower lip 52. Before that plane is reached, however, spindle shaft 106 engages hub flexures 28 so that disk 12 and cartridge 10 together are accurately centered on the spindle. Then, when flange lower lip 112 does reach said plane, the plate annular seal is intercepted by the rim lower lip, and thereafter remains in firm sealing contact therewith as the spindle continues on through opening 46 into further engagement with hub 20. As flange lower lip 112 thus moves out of contact with plate annular seal 98, the flange upper lip 110 moves into sealing contact with hub annular seal 22, and annular pole piece 118 engages the lowermost surface of hub 20 radially inward of seal 22 to magnetically couple the spindle to the hub. Further upward movement of spindle 104 then causes the spindle to push hub 20 upwardly away from cartridge bottom wall 34 and toward top wall 32. In so doing, the upward pushing force of spindle 104 overcomes the downward attracting force of magnetic means 54, and thereby urges hub 20 away from magnetic clips 56 and hub seal 22 away from rim upper lip 50. Disk 12 is thus moved out of its stationary, sealed relationship with bottom wall 34, thereby freeing the disk for rotation relative to that wall; and disk upper side 16 is thus moved closer to top wall 32, thereby rendering that side of disk medium 14 more optically accessible through window 60. With the disk thus properly positioned for rotation and optical recording or playback, the upward movement of spindle 104 is stopped; and with the spindle already magnetically coupled to the hub, motor 102 is energized to rotate the disk. As seen in FIGS. 5–7, with the mechanism now energized and driving the disk, the cartridge bottom wall 34 is no longer sealed to the disk but instead is sealed to the apparatus cover plate 94, and the spindle 104 is no longer sealed to the cover plate but instead is sealed to the disk, whereby the cartridge 10 and apparatus chamber 130 are open to each other but the two together are closed from the outside world (except for air admitted through filter 134).

As depicted in FIG. 2, apparatus 70 also includes a laser write/read optical head 138, mounted in housing 72 for close traversing radial movement relative to cartridge window 60, for optically recording and retrieving information on disk medium 14 through transparent window sheet 62 when closure member 66 is open and disk 12 is rotating.

Although not shown, the apparatus may further include a device for automatically unlocking and moving closure member 66 from its normally closed position to its open position in response to insertion of the cartridge into its operative position. Similarly, provision may be made, e.g., by a return spring, in the apparatus or in the cartridge itself for returning the closure member to its closed (and locked) position upon removal of the cartridge. Also, means may be provided for automatically energizing and de-energizing disk-drive solenoid 122 in response to closing and opening, respectively, of the apparatus access door when a cartridge is in its operative position.

FIGS. 3 and 5–7 each show the cartridge supported in its operative position with closure member 66 moved to its open position. As seen in FIGS. 6 and 7, a resilient spring catch 140 is provided on cartridge top wall 32 to engage detents 142 and 144 on closure member 66 for the purpose of releasably holding member 66 in its open and closed positions, respectively. FIG. 3 shows optical head 138 positioned over the radially outer end of cartridge window 60. FIG. 5 shows head 138 at a point along its traversing radial movement path over window 60. FIG. 6 shows head 138 disposed successively at the outer end and near the inner end of said path.

Upon completion of a recording or playback operation, optical head 138 is returned to its initial position shown in FIG. 2, motor 102 is de-energized to terminate its drive input to disk 12, solenoid 122 is de-energized, and magnetic coupling means 114 becomes uncoupled from the disk as the drive spindle returns to its lower, at-rest position shown in FIG. 3. As mentioned above, solenoid 122 may be de-energized and the spindle returned to its rest position in response to opening of the apparatus access door. Both cartridge 10 and chamber 130 are thus restored to their separately closed conditions depicted in FIG. 3, wherein magnetic means 54, hub seal 22, and rim upper lip 50 cooperate to maintain disk 12 in stationary, sealed relationship with cartridge bottom wall 34, and wherein biased cover plate 94, plate seal 98, and flange lower lip 112 cooperate to maintain spindle 104 in firmly sealed relationship with apparatus reference plate 82. The cartridge now can safely be withdrawn from the receiving and supporting means 90 and removed from the apparatus. Preferably, as suggested above, cartridge closure member 66 is automatically returned to its normally closed position covering window 60 as the cartridge is removed.

It will thus be seen that the present invention, in comparison with the prior art, provides a significantly more efficient, reliable, and durable way of protecting an optical disk in a cartridge against damage or impairment by other elements during all stages of storage, handling, and use of the disk.

The invention has been described in detail with particular reference to the preferred embodiment thereof, but it will be understood that variations and modifications can be effected within the spirit and scope of the invention.

What is claimed is:

1. An optical disk cartridge adapted for use in cooperating write/read apparatus having a rotatable drive spindle and a movable optical head, said cartridge containing a rigid optical disk including a flat information-storage medium and a magnetically attractable hub with a compliant annular seal thereon projecting from said medium, said cartridge comprising:

first and second substantially rigid opposed walls fixedly spaced from and substantially coextensive and parallel with each other, said disk being disposed between and substantially parallel with said walls, said first wall having a round opening therein concentric with said hub to provide access thereto by the drive spindle of the cooperating apparatus, said opening being bounded by a circular rim aligned with said annular hub seal, said first wall bearing magnetic means near said rim for attracting said hub and thereby drawing said hub seal into sealing contact with said rim, to retain said disk in stationary, sealed relationship with said first wall when said cartridge is not operatively positioned in the cooperating apparatus, said hub being engageable and axially movable by the apparatus drive spindle away from said first wall, in opposition to said magnetic means, to urge said disk out of said stationary, sealed relationship and thereby render said disk free to rotate when said cartridge is operatively positioned in the cooperating apparatus.

2. A cartridge as claimed in claim 1 wherein said second wall has a window therein aligned with a portion of said disk medium to provide optical access to said medium by the optical head of the cooperating apparatus, said window having a thin, planar sheet of transparent material extending thereacross to protect said medium from exterior contaminants without interfering with said optical access.

3. A cartridge as claimed in claim 2 further comprising a closure member mounted on said second wall for movement from a closed position covering said window to an open position uncovering said window, to protect said window and thereby further protect said medium when said cartridge is not in use in the cooperating apparatus, and to permit said optical access when said cartridge is in said use.

4. Apparatus for recording and retrieving information on an optical disk contained in a cartridge, the disk having a flat, substantially rigid information-storage medium and a magnetically attractable hub with a compliant annular seal thereon projecting from the medium, the cartridge including first and second opposed, parallel, rigidly spaced walls disposed on opposite sides of the disk, the first wall having an opening therein bounded by a circular rim concentrically aligned with the annular hub seal and magnetic means near the rim for attracting the hub and thereby drawing the hub seal into sealing contact with the rim, to retain the disk in stationary, sealed relationship with the first wall when the cartridge is not in use, said apparatus comprising:
means for supporting the cartridge in an operative position;
a drive spindle rotatable about an axis and engageable with the hub, said spindle having a circumferential flange thereon that is concentrically aligned with the annular hub seal when the cartridge is in said operative position, said spindle being mounted for movement along said axis through the first wall opening and toward the second wall when the cartridge is in said position; and means for moving said drive spindle along said axis through the first wall opening and toward the second wall into engagement with the hub, so as to push the hub away from the first wall, in opposition to the magnetic means thereon, and thereby urge the disk out of said stationary, sealed relationship, to render the disk freely rotatable relative to the first wall when the cartridge is in use, said flange moving concurrently into sealing contact with the hub seal to seal the disk to said spindle when the disk is not sealed to the first wall.

5. Apparatus as claimed in claim 4 further comprising an enclosure including a movable member with a compliant annular seal thereon encircling said spindle, said enclosure member seal being concentrically aligned with the circular rim when the cartridge is in said operative position, and wherein said enclosure member seal moves parallel with said axis into sealing contact with the rim, as said flange moves into sealing contact with the hub seal, to seal the first wall to said enclosure member when the first wall is not sealed to the disk.

6. Apparatus as claimed in claim 5 wherein said enclosure member seal is concentrically aligned with said flange and is in sealing contact therewith, when said flange is not in sealing contact with the hub seal, to seal said enclosure member to said drive spindle when said enclosure member is not sealed to the first wall.

7. Apparatus as claimed in claim 6 wherein said enclosure member comprises a resiliently flexible spring-like cover plate disposed generally perpendicular to said axis and having a round hole therein concentric with said axis and bounded by said enclosure member seal, said plate being biased in a direction extending generally parallel with said axis toward the cartridge, so as to urge said enclosure member seal thereon in said direction and thereby effect, alternately, said sealing contact with said flange, to seal said enclosure member to said spindle, and said sealing contact with the rim, to seal said enclosure member to the first wall.

8. Apparatus as claimed in claim 6 wherein said drive spindle has magnetic coupling means thereon near said flange for coupling said spindle to the hub when said spindle has been moved into engagement therewith, and further comprising means for rotating said spindle about said axis to impart rotation to the disk when said spindle has been coupled to the hub.

9. Apparatus as claimed in claim 8, the cartridge second wall having an optical access window therein facing a portion of the disk medium, with a thin, planar sheet of transparent protective material sealed across the window, said apparatus further comprising an optical head, mounted for close traversing movement relative to the window, for optically recording and retrieving information on the medium through the transparent sheet when said rotation has been imparted to the disk.

10. In combination, an optical disk, a cartridge containing said disk, and apparatus operable with said cartridge to record and retrieve information on said disk said disk comprising:
a flat, circular, substantially rigid, information-storage medium having upper and lower sides, and
a magnetically attractable hub with a compliant annular seal thereon projecting from said lower side;
said cartridge comprising:
top and bottom walls coextending substantially parallel to and spaced fixedly from each other, with said disk disposed therebetween so that said top and bottom walls face said upper and lower sides respectively, said bottom wall including
a central opening bounded by a circular rim having upper and lower seal-contacting lips, said rim upper lip being concentrically aligned with said hub annular seal, and magnetic means near said rim for attracting said hub and thereby drawing said hub seal into sealing contact with said rim upper lip, to retain said disk in stationary, sealed relationship with said bottom wall when said cartridge is not in use in said apparatus; and said apparatus comprising:

means for supporting said cartridge in an operative position, a drive spindle translatable along and rotatable about an axis and engageable with said hub, said spindle including a circumferential flange having upper and lower seal-contacting lips, said flange upper lip being concentrically aligned with said hub annular seal when said cartridge is supported in said operative position, said spindle being mounted for translation along said axis through said bottom wall opening and toward said top wall when said cartridge is in said position, and means for translating said spindle along said axis through said bottom wall opening and toward said top wall into engagement with said hub, so as to push said hub away from said bottom wall, in opposition to said magnetic means, and thereby urge said disk out of said stationary, sealed relationship, to render said disk freely rotatable relative to said bottom wall when said cartridge is in use in said apparatus, said flange upper lip moving concurrently into sealing contact with said hub seal to seal said disk to said spindle when said disk is not sealed to said bottom wall.

11. The combination claimed in claim 10 wherein said apparatus further comprises an enclosure including a movable member with a compliant annular seal thereon encircling said spindle, said enclosure member seal being concentrically aligned with said rim lower lip when said cartridge is supported in said operative position, and wherein said enclosure member seal moves parallel to said axis into sealing contact with said rim lower lip, as said flange upper lip moves into sealing contact with said hub seal, to seal said bottom wall to said enclosure member when said bottom wall is not sealed to said disk.

12. The combination claimed in claim 11 wherein said enclosure member seal is concentrically aligned with said flange lower lip and is in sealing contact therewith, when said flange upper lip is not in sealing contact with said hub seal, to seal said enclosure member to said spindle when said enclosure member is not sealed to said bottom wall.

13. The combination claimed in claim 12 wherein said spindle further includes magnetic coupling means near said flange for coupling said spindle to said hub when said spindle has been moved into engagement therewith, and wherein said apparatus further comprises means for rotating said spindle about said axis to impart rotation to said disk when said spindle has been coupled to said hub.

14. The combination claimed in claim 13 wherein said top wall includes an optical access window facing a portion of said upper side, with a thin, planar sheet of transparent protective material sealed across said window, and wherein said apparatus further comprises an optical head, mounted for close traversing movement relative to said window, for optically recording and retrieving information on said medium through said transparent sheet when said rotation has been imparted to said disk.

15. The combination claimed in claim 14 wherein said cartridge further comprises a closure member mounted on said top wall for movement from a closed position covering said window to an open position uncovering said window, to protect said window sheet and thereby further protect said medium when said cartridge is not in use in said apparatus, and to permit optical access through said sheet to said medium when said cartridge is in use in said apparatus.

16. In combination, an optical disk, a cartridge containing said disk, and apparatus operable with said cartridge to record and retrieve information on said disk said disk comprising:

a flat, circular, substantially rigid, information-storage medium having upper and lower sides, and a magnetically attractable hub with a compliant annular seal thereon projecting from said lower side;

said cartridge comprising:

top and bottom walls coextending substantially parallel to and spaced fixedly from each other, with said disk disposed therebetween so that said top and bottom walls face said upper and lower sides respectively, said bottom wall including a central opening bounded by a circular rim having upper and lower seal-contacting lips, said rim upper lip being concentrically aligned with said hub annular seal, and magnetic means near said rim for attracting said hub and thereby drawing said hub seal into sealing contact with said rim upper lip, to retain said disk in stationary, sealed relationship with said bottom wall when said cartridge is not in use in said apparatus; and said apparatus comprising:

means for supporting said cartridge in an operative position, a drive spindle translatable along and rotatable about an axis and engageable with said hub, said spindle including a circumferential flange having upper and lower seal-contacting lips, said flange upper lip being concentrically aligned with said hub annular seal when said cartridge is supported in said operative position, said spindle being mounted for translation along said axis through said bottom wall opening and toward said top wall when said cartridge is in said position, means for translating said spindle along said axis through said bottom wall opening and toward said top wall into engagement with said hub, so as to push said hub away from said bottom wall, in opposition to said magnetic means, and thereby urge said disk out of said stationary, sealed relationship, to render said disk freely rotatable relative to said bottom wall when said cartridge is in use in said apparatus, said flange upper lip moving concurrently into sealing contact with said hub seal to seal said disk to said spindle when said disk is not sealed to said bottom wall, and an enclosure including a movable member with a compliant annular seal thereon encircling said spindle, said enclosure member seal being concentrically aligned with said rim lower lip when said cartridge is supported in said operative position, said enclosure member seal being movable parallel to said axis into sealing contact with said rim lower lip, as said flange upper lip moves into sealing contact with said hub seal, to seal said bottom wall to said enclosure member when said bottom wall is not sealed to said disk, said enclosure member seal also being concentrically aligned with said flange lower lip and disposed in sealing contact therewith, when said flange upper lip is not in sealing contact with said hub seal, to seal said enclosure member to said spindle when said enclosure member is not sealed to said bottom wall, said enclosure member including a resiliently flexible spring-like cover plate disposed generally perpendicular to said axis and having a round hole therein concentric with said axis and bounded by said enclosure member seal, said plate being biased in a direction extending generally parallel to said axis toward said cartridge, so as to urge said enclosure member seal thereon in said direction and thereby effect, alternately, said sealing contact with said flange lower lip, to seal said enclosure member to said spindle, and said sealing contact with said rim lower lip, to seal said enclosure member to said bottom wall.

* * * * *

UNITED STATES PATENT AND TRADEMARK OFFICE
CERTIFICATE OF CORRECTION

PATENT NO. : 4,571,718

DATED : February 18, 1986

INVENTOR(S) : Steven P. Cahill and Roger G. Covington

It is certified that error appears in the above—identified patent and that said Letters Patent is hereby corrected as shown below:

Abstract, line 12, "atrract should read --attract--.

Abstract, line 19, "the" (second occurrence) should read --that--.

Column 1, line 62, "from" should have been inserted before --contact--.

Column 4, line 47, "in" (third occurrence) should read --is--.

Column 6, line 47, "towrd" should read --toward-- and "Susequent" should read --Subsequent--.

Column 9, line 62, "means" should begin a new indented paragraph.

Signed and Sealed this

Seventh Day of October, 1986

[SEAL]

Attest:

DONALD J. QUIGG

Attesting Officer

Commissioner of Patents and Trademarks